United States Patent
Lincoln (10) Patent No.: US 8,499,316 B2
(45) Date of Patent: Jul. 30, 2013

(54) PROGRAM IDENTIFICATION USING A PORTABLE COMMUNICATION DEVICE

(75) Inventor: Staffan Lincoln, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 757 days.

(21) Appl. No.: 11/747,670

(22) Filed: May 11, 2007

(65) Prior Publication Data

US 2008/0282019 A1 Nov. 13, 2008

(51) Int. Cl.
*H04H 60/32* (2008.01)

(52) U.S. Cl.
USPC .................... 725/19; 725/21; 725/39

(58) Field of Classification Search
None
See application file for complete search history.

(56) References Cited

U.S. PATENT DOCUMENTS

| | | | |
|---|---|---|---|
| 5,949,492 A | 9/1999 | Mankovitz | |
| 6,088,455 A * | 7/2000 | Logan et al. | 380/200 |
| 8,255,938 B2 * | 8/2012 | Lee et al. | 725/19 |
| 2002/0174430 A1 * | 11/2002 | Ellis et al. | 725/46 |
| 2003/0023986 A1 * | 1/2003 | Honmura | 725/134 |
| 2003/0217151 A1 * | 11/2003 | Roese et al. | 709/225 |
| 2006/0031883 A1 * | 2/2006 | Ellis et al. | 725/58 |
| 2008/0082510 A1 * | 4/2008 | Wang et al. | 707/3 |
| 2008/0127257 A1 * | 5/2008 | Kvache | 725/39 |

FOREIGN PATENT DOCUMENTS

| | | |
|---|---|---|
| EP | 0 210 609 A2 | 2/1987 |
| EP | 0 593 202 A1 | 4/1994 |
| EP | 1 039 400 | 9/2000 |
| WO | WO 2005/079499 | 9/2005 |
| WO | WO 2007/049927 | 5/2007 |

OTHER PUBLICATIONS

International Search Report and Written Opinion of the International Searching Authority corresponding to PCT/EP2007/061984, Jan. 29, 2009, 11 pages.

* cited by examiner

*Primary Examiner* — Cai Chen
(74) *Attorney, Agent, or Firm* — Harrity & Harrity, LLP (57) ABSTRACT

According to one aspect, a portable communication device records a program being presented by a media presenting apparatus as media data, generates a query regarding a media channel and a program on that channel, which query includes said media data and sends said query to a system for determining a program on a media channel operated by a program determination service provider. The system receives the query, compares the query media data with data of a number of sets of reference media data related to at least one reception environment, where each set corresponds to a broadcast media channel, identifies the media channel, identifies a program in the media channel through using an electronic program guide, and sends data identifying the channel and the program to the portable communication device.

30 Claims, 6 Drawing Sheets

PROGRAM IDENTIFICATION USING A PORTABLE COMMUNICATION DEVICE

TECHNICAL FIELD

The present invention may relate to the field of providing services for communication devices such as portable communication devices. The present invention may relate to a method, system, or computer program product that may determine a program on a media channel for a user of a communication device as well as to a method, communication device, or computer program product for receiving a determination of a program on a media channel from a program determination service provider.

DESCRIPTION OF RELATED ART

Television is a source of enjoyment for many people. When a viewer watches a program on his/her television set he/she may be interested in finding out information about the program he/she is watching. The user may not have access to electronic program guides and, in this case, it may be burdensome for the user to find out what program is being broadcast, especially if the user does not have a remote control close at hand. Most users today have a communication device, such as a portable communications device, which may be a cellular phone.

SUMMARY

Some embodiments may provide a service for a television viewer or radio listener in which the program being viewed or listened to can be identified with the help of a portable communication device.

A first aspect may be directed towards a method for determining a program on a media channel for a user of a portable communication device. The method may include receiving a query over a wireless wide area network from the user regarding a media channel and a program being broadcast on that channel, which query includes media data recorded by the user, comparing the media data of the query with data of a number of sets of reference media data related to at least one reception environment, where each set corresponds to a broadcast media channel, and identifying the media channel based on a match between media data of the query and data of a set of reference media data, identifying a program in the media channel based on a match between time data of media data used in the identification of the channel and time data of a program in an electronic program guide for said channel, and sending data identifying the channel and the program to the portable communication device of the user over the wireless wide area network.

A second aspect may include the features of the first aspect, and further may include receiving and demodulating a number of media channels and recording said media channels in order to generate said sets of reference media data.

A third aspect may include the features of the first aspect, wherein each set of reference media data may include reference time data associated with the time of broadcasting a media channel, the query received from the user may include time data indicating when the media data was recorded and comparing may include comparing media data of the sets of reference media data in an interval covering the time data of the query.

A fourth aspect may include the features of the third aspect, wherein the time data used for identifying the program is the time data provided by the user.

A fifth aspect may include the features of the first aspect, wherein the time data used for identifying the program is time data associated with a part of the set of reference media data of the media channel being identified.

A sixth aspect may include the features of the first aspect, and further may include investigating, in the electronic program guide, if the identified program is being broadcast in the future and sending reminder data to the user over the wireless wide area network indicating when the identified program is being broadcast in the future.

A seventh aspect may include the features of the sixth aspect, wherein the query may include a favourites setting and investigating if the identified program is being broadcast in the future and sending of reminder data are performed based on this favourites setting.

An eighth aspect may include the features of the sixth aspect, wherein investigating if the identified program is being broadcast in the future is performed recurrently and sending reminder data is performed each time the identified program is to be broadcast.

A ninth aspect may include the features of the sixth aspect, wherein investigating if the identified program is being broadcast in the future is performed once and sending reminder data may include sending reminder data identifying a number of times the electronic program guide indicates that the program will be broadcast in the future.

A tenth aspect may include the features of the first aspect, wherein identifying a program in the media channel may include identifying a section of the program.

An eleventh aspect may include the features of the first aspect, wherein there are several possible reception environments and further may include receiving environment identifying data from the user.

A twelfth aspect may include the features of the eleventh aspect, wherein the environment identifying data may include media data recorded by the user of media channels that can be received in the reception environment.

A thirteenth aspect may include the features of the eleventh aspect, wherein the receiving environment identifying data and the query may include location data, wherein restrictions are applied on services related to the identifying of the media program if a difference between the location data of the environment identifying data and the location data of the query is above a location difference threshold.

A fourteenth aspect is directed towards a system for determining a program on a media channel for a user of a portable communication device and may include: a wireless wide area network communication interface for receiving a query via the wireless wide area network regarding a media channel and a program being broadcast on that channel, which query may include media data recorded by the user, and a program determination device including an electronic program guide, a sound comparing unit, and a program handling unit arranged to order the sound comparing unit to compare the media data of the query with the data of a number of sets of reference media data related to at least one reception environment, where each set corresponds to a broadcast media channel, identify the media channel based on a match between media data of the query and data of a set reference media data, identify a program in the media channel based on a match between time data of media data used in the identification of the channel and time data of a program in an electronic program guide for said channel, and order the wireless wide area network communication device to send data identifying the channel and the program to the portable communication device of the user.

A fifteenth aspect may include the features of the fourteenth aspect, and further may include a set of media channel receiving devices for receiving and demodulating said media channels and a set of media recording devices for recording said media channels in order to generate said sets of reference media data.

A sixteenth aspect may include the features of the fourteenth aspect, wherein each set of reference media data may include reference time data associated with the time of broadcasting a media channel, the query received from the user may include time data indicating when the media data was recorded and the program handling unit when ordering the sound comparing unit to compare media data of the query with the data of the reference media data sets is arranged to order comparing media data of the sets of reference media data in an interval covering the time data received from the user.

A seventeenth aspect may include the features of the sixteenth aspect, wherein the located time data used for identifying the media program is the time data provided by the user.

An eighteenth aspect may include the features of the fourteenth aspect, wherein the time data used for identifying the program is time data associated with a part of the set of reference media data for which a media channel is identified.

A nineteenth aspect may include the features of the fourteenth aspect, wherein the program handling unit is further arranged to investigate in the electronic program guide if the identified program is being broadcast in the future and order the wireless wide area network communication device to send reminder data to the user indicating when the identified program is being broadcast in the future.

A twentieth aspect may include the features of the nineteenth aspect, wherein the query may include a favourites setting and the program handling unit is arranged to investigate if the identified program is being broadcast in the future and order the wireless wide area network communication device to send reminder data based on this favourites setting.

A twenty-first aspect may include the features of the nineteenth aspect, wherein the program handling unit is arranged to investigate if the identified program is being broadcast in the future recurrently and order the sending of reminder data each time the identified program is to be broadcast.

A twenty-second aspect may include the features of the nineteenth aspect, wherein the program handling unit is arranged to only once investigate if the identified program is being broadcast in the future and when ordering the sending of reminder data is further arranged to order sending of reminder data identifying a number of times that the electronic program guide indicates the program will be broadcast in the future.

A twenty-third aspect may include the features of the fourteenth aspect, wherein the identifying of a program in the media channel may include identifying a section of the program.

A twenty-fourth aspect may include the features of the fourteenth aspect, wherein there are several possible reception environments and the program handling unit is further arranged to receive environment identifying data from the user.

A twenty-fifth aspect may include the features of the twenty-fourth aspect, wherein the receiving environment identifying data may include media data recorded by the user of every media channel that can be received in the reception environment.

A twenty-sixth aspect may include the features of the twenty-fourth aspect, wherein the receiving environment identifying data and the query may include location data, wherein the program handling unit is arranged to apply restrictions on services related to the identifying of the media program if a difference between the location data of the environment identifying data and the location data of the query is above a location difference threshold.

A twenty-seventh aspect is directed towards a computer program product for determining a program on a media channel for a user of a portable communication device and may include: computer program code, to make a program determination device of a system for providing program determination execute, when said program code is loaded in the program determination device, order a sound comparing unit to compare media data of a query with data of a number of sets of reference media data, where said query has been received over a wireless wide area network and concerns a media channel and a program on that channel being broadcast and the media data has been recorded by the user, while each set of reference media data is related to at least one reception environment, where each set corresponds to a broadcast media channel,
identify the media channel based on a match between media data of the query and data of a set of reference media data, identify a program in the media channel based on a match between time data of media data used in the identification of the channel and time data of a program in an electronic program guide for said channel, and order a wireless wide area network communication device to send data identifying the channel and the program to the portable communication device of the user.

A twenty-eighth aspect is directed towards a method for receiving a determination of a program on a media channel from a program determination service provider and may include: recording a section of a program being presented by a media presenting apparatus as media data, generating a query regarding a media channel and a program on that channel, which query may include said recorded media data, sending said query over a wireless wide area network to said program determination service provider, and receiving data identifying the channel and the program from the program determination service provider over the wireless wide area network.

A twenty-ninth aspect may include the features of the twenty-eighth aspect, where the program has been determined through the media program determination service provider having compared the media data of the query with data of a number of sets of reference media data related to at least one reception environment, where each set corresponds to a broadcast media channel, identifying the media channel based on a match between media data of the query and data of a set of reference media data and identifying the program in the media channel based on a match between time data of media data used in the identification of the channel and time data of a program in an electronic program guide for said channel.

A thirtieth aspect may include the features of the twenty-eighth aspect, and further may include registering time data when the section is recorded and including the time data in the query.

A thirty-first aspect may include the features of the twenty-eighth aspect, and further may include receiving reminder data over the wireless wide area network indicating when the identified program is being broadcast in the future.

A thirty-second aspect may include the features of the thirty-first aspect, and further may include receiving a favourites setting from the user and including the favourites setting in the query, wherein receiving reminder data is performed based on this favourites setting.

A thirty-third aspect may include the features of the thirty-first aspect, wherein the reminder data is received recurrently at points in time when the identified program is being broadcast.

A thirty-fourth aspect may include the features of the thirty-first aspect, wherein the reminder data is received at least once and may include data identifying a number of times the program will be broadcast in the future and further may include making at least one favourites reminding setting according to the received reminder data and alerting the user of the broadcasting of the favourites program based on said favourites reminding setting.

A thirty-fifth aspect may include the features of the twenty-eighth aspect, wherein the data identifying the program in the media channel may include data identifying a section of the program.

A thirty-sixth aspect may include the features of the twenty-eighth aspect, wherein there are several possible reception environments and further may include sending environment identifying data to the media program determination service provider.

A thirty-seventh aspect may include the features of the thirty-sixth aspect, and further may include recording media data including data from every media channel the media presenting apparatus can receive and including this media data in the environment identifying data.

A thirty-eight aspect may include the features of the thirty-sixth aspect, wherein the receiving environment identifying data and the query include location data, in order to allow the program determination service provider to apply restrictions on services related to the identifying of the media program.

A thirty-ninth aspect is directed towards a portable communication device for receiving a determination of a program on a media channel from a program determination service provider may include: a media recording unit, a wireless wide area network communication unit, and a control unit arranged to order the media recording unit to record a section of a media program being presented by a media presenting apparatus as media data, generate a query regarding a media channel and a program on that channel, which query may include said recorded media data, order said wireless wide area network communication unit to send said query to said program determination service provider, and receive data identifying the channel and the program from the program determination service provider via the wireless wide area network communication unit.

A fortieth aspect may include the features of the thirty-ninth aspect, wherein the program has been determined through the media program determination service provider having compared the media data of the query with data of a number of sets of reference media data related to at least one reception environment, where each set corresponds to a broadcast media channel, identifying the media channel based on a match between media data of the query and data of a set of reference media data and identifying the program in the media channel based on a match between time data of media data used in the identification of the channel and time data of a program in an electronic program guide for said channel.

A forty-first aspect may include the features of the thirty-ninth aspect, wherein the control unit is further arranged to register time data when the section is recorded and include the time data in the query.

A forty-second aspect may include the features of the thirty-ninth aspect, wherein the control unit is further arranged to receive reminder data indicating when the identified program is being broadcast in the future via the wireless wide area network communication unit.

A forty-third aspect may include the features of the forty-second aspect, and further may include a user interface, where the control unit is further arranged to receive a favourites setting from the user via the user interface and include the favourites setting in the query, where the reception of reminder data is based on this favourites setting.

A forty-fourth aspect may include the features of the forty-second aspect, wherein the reminder data is received recurrently at points in time when the identified program is being broadcast.

A forty-fifth aspect may include the features of the forty-second aspect, and further may include a favourites reminding storage, where the reminder data is received at least once and may include data identifying a number of times the program will be broadcast in the future and the control is further arranged to make at least one favourites reminding setting according to the received reminder data in the favourites reminding storage and alert the user of the broadcasting of the favourites program based on said setting.

A forty-sixth aspect may include the features of the thirty-ninth aspect, wherein the data identifying the program in the media channel may include data identifying a section of the program.

A forty-seventh aspect may include the features of the thirty-ninth aspect, wherein there are several possible reception environments and the control unit is further arranged to order sending of environment identifying data to the program determination service provider.

A forty-eighth aspect may include the features of the forty-seventh aspect, wherein the control unit is further arranged to order the media recording unit to record media data including data from media channels the media presenting apparatus can receive and including this media data in the environment identifying data.

A forty-ninth aspect may include the features of the forty-seventh aspect, and further may include a position unit, where the control unit is arranged to receive location data from said position unit for inclusion in the receiving environment identifying data and the query include location data, in order to allow the media program determination service provider to apply restrictions on services related to the identifying of the media program.

A fiftieth aspect may include the features of the thirty-ninth aspect, wherein the portable communication device is a cellular phone.

A fifty-first aspect is directed towards a computer program product for receiving a determination of a program on a media channel from a media program determination service provider and may include: computer program code, to make a portable communication device execute, when said program code is loaded in the portable communication device, order a media recording unit to record a section of a program being presented by a media presenting apparatus as media data, generate a query regarding a media channel and a program on that channel, which query may include said recorded media data, order a wireless wide area network communication unit to send said query to said program determination service provider, and receive data identifying the channel and the program from the program determination service provider via the wireless wide area network communication unit.

Exemplary embodiments may be implemented in a cellular phone with limited additional functionality, because all of the hardware may already be there. Exemplary embodiments may be implemented by only including some additional software. Exemplary embodiments may enable a user to find out information about a program on a media channel in a simple way using his/her portable communication device.

It should be emphasized that the term "comprises/comprising" when used in this specification is taken to specify the presence of stated features, steps or components, but does not preclude the presence or addition of one or more other features, integers, steps, components or groups thereof.

BRIEF DESCRIPTION OF THE DRAWINGS

Embodiments will now be described in more detail in relation to the enclosed drawings, in which.

DETAILED DESCRIPTION OF EMBODIMENTS

In the following there will be described how a user of a portable communication device may determine the television program he/she is watching on a television apparatus with the aid of a portable communication device. However, it should be realised that the principles given below are not limited to television, but may just as well be applied for radio.

Figure 1:
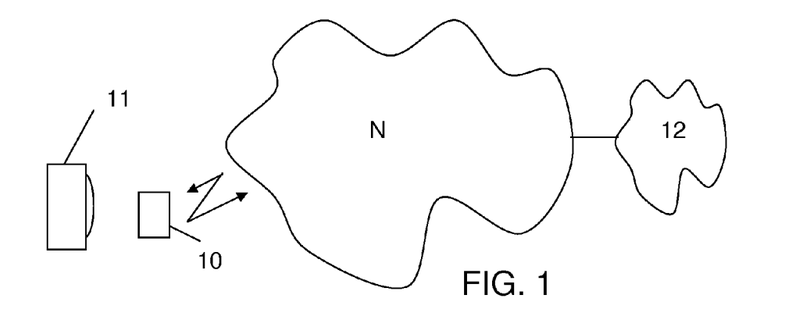
FIG. 1 shows an exemplary environment including a portable communication device and a media presenting apparatus for one embodiment.

FIG. 1 shows an exemplary environment that may include a portable communication device and a media presenting apparatus in one embodiment. In the embodiment of FIG. 1, a portable communication device 10 may be provided close to a media presenting apparatus, which may include a television apparatus 11. The media presenting apparatus may include a radio. The portable communication device 10 may communicate with a system for determining a program on a media channel via a wireless wide area network. In one embodiment, the portable communication device 10 may communicate with a system for determining a program on a media channel via a wired line. The portable communication device 10 may communicate, via a wireless wide area network N, with a system 12 for determining a program on a media channel. This network N may be a GSM (Global System for Mobil Communications) network, a WCDMA (Wideband Code Division Multiple Access) network, or an LTE (Long Term Evolution) network, for example. Network N may be any wireless, wide-area network allowing the transmission of data. In one embodiment, network N may be a wireless, local-area network. In one embodiment, the portable communication device 10 may be in wireless contact with the network N, while the system 12 may have a fixed, e.g., wired, connection. It should, however, be realised that the system 12 may also be in contact with the network N wirelessly.

Figure 2:
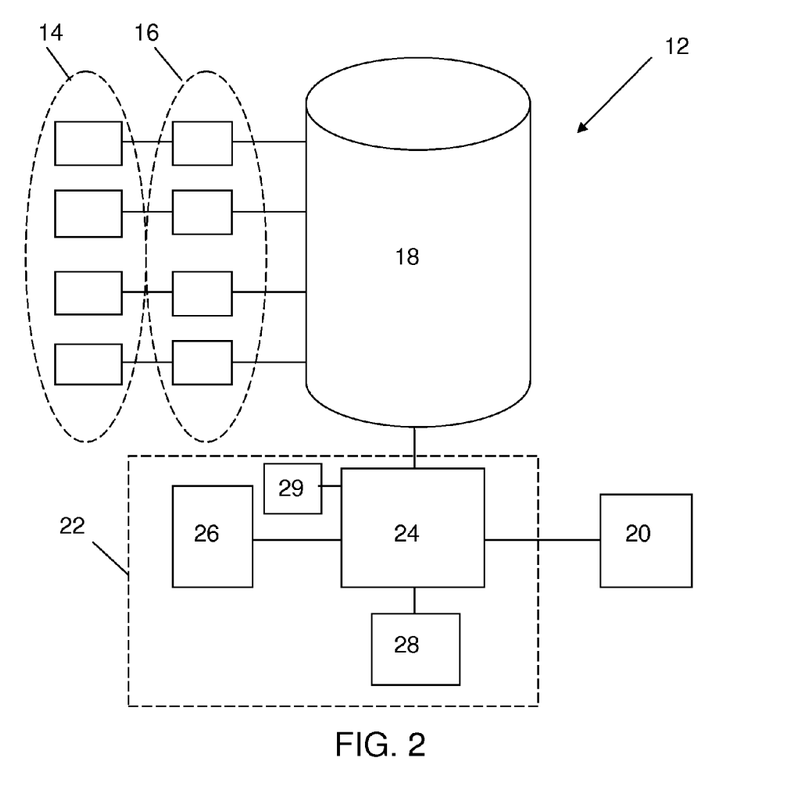
FIG. 2 shows an exemplary block schematic of an exemplary system for determining a program on a media channel according to one embodiment.

FIG. 2 shows an exemplary block schematic of an exemplary system 12 for determining a program on a media channel according to one embodiment. The system 12 may be run by a program determination service provider, which may be a service provider that provides the service of determining media programs such as television programs. In one embodiment, system 12 may remind a user of the broadcasting of favourite programs. The system 12 may include a set of media channel receiving devices 14, which may be television channel receiving devices arranged to receive and demodulate a number of television channels being broadcast. There may be provided one receiving device for each channel that may exist in a number of reception environments. In one embodiment, a reception environment may be a terrestrial reception environment, e.g., limited to the terrestrial television signals received in a geographical area, such as in a country, state, or region or in various parts of a country, state or region. A reception environment may also be a cable television reception environment, e.g., the channels provided by a cable television supplier or a satellite television reception environment, e.g., the channels provided by a satellite television supplier. A reception environment may also be a channel or group of channels provided over a network connection, such as an Internet connection. There may be provided a set of media recording devices. The media recording devices may include television recording devices 16, where there may be one television recording device for each television channel receiving device 14, for example. The television recording devices may be connected to a program file storage 18 and may save the recorded television channels as a number of sets of reference media data together with reference time data of when they were broadcast, e.g., broadcast times, in the program file storage 18. This reference time data may be provided in the form of time stamps associated with a stored media stream. There may be a program file storage section provided for each television channel. In one embodiment, only sound may be recorded. In another embodiment, sound and video may be recorded. Therefore, the sets of reference media data may, for example, be saved in the MP3 format. In one embodiment, it may be possible to apply the principles on recorded video. In this embodiment, it may be possible to save the reference media data, for example, in the MPEG format. If only sound is recorded, the costs and required storage space may be lowered. However, if the sets of reference media data are stored in a video format, the sets of reference media may be compared to both sound and video, which may allow a greater flexibility that can be adapted to the media recording capabilities of different portable communication devices.

The system 12 may include a wireless wide area network communication interface 20 for communicating with the wireless wide area network N. The interface 20 may be connected to a program handling unit 24 of a program determination device 22. In this device 22 the program handling unit 24 may be connected to an electronic program guide 26, to a sound comparing unit 29 as well as to a user storage 28. The user storage 28 may include data about each user of the service. This storage 28 may store information such as which reception environment a user belongs to and data about various favourite programs of the user.

Figure 3:
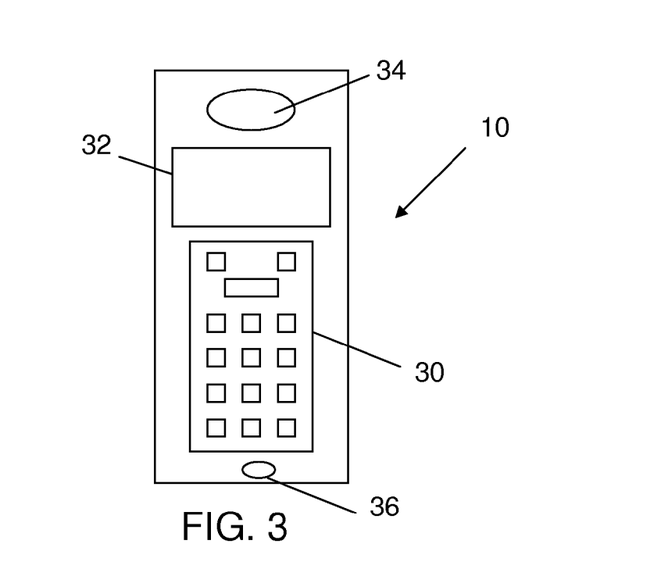
FIG. 3 shows a front view of an exemplary portable communication device.

FIG. 3 shows a front view of an exemplary portable communication device according to one embodiment. In one embodiment, the device may include a cellular phone 10. The phone 10 has a display 32, a user input unit in the form of a keypad 30 including a number of keys, a speaker 34 and a media recording unit in the form of a microphone 36. The keypad 30 may be used for entering information, such as selecting of functions and responding to prompts. The display 32 may be used for displaying prompts and information about functions to a user of the phone 10. The speaker 34 may be arranged to emit sound, like speech or music being played in the phone, alerting the user of events etc. The microphone 36 may be arranged to record sound. The cellular phone 10 may be just one example of a device in which an embodiment may be implemented. In embodiment may, for example, the device may include a PDA (personal digital assistant), a palm-top computer, or a lap-top computer. In one embodiment, these alternative devices may record sound and/or video and may communicate wirelessly.

Figure 4:
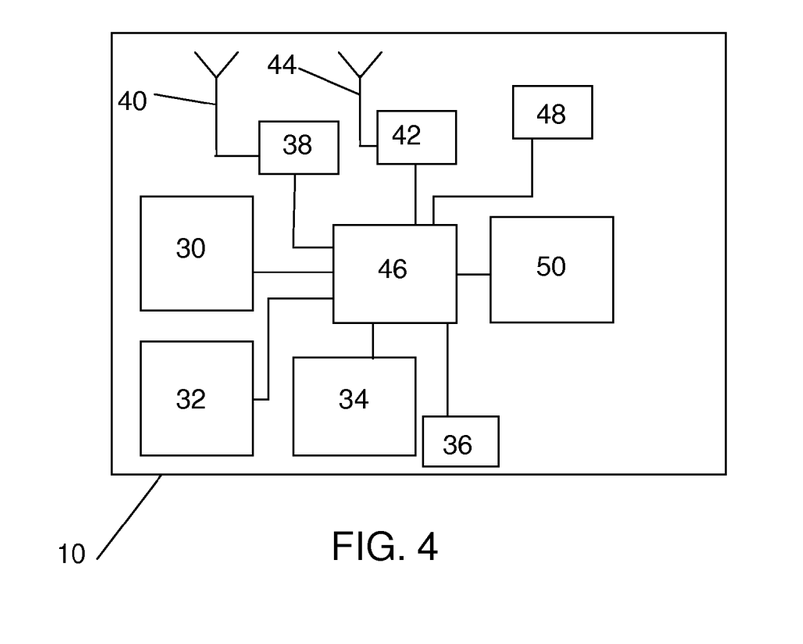
FIG. 4 shows an exemplary block schematic of the relevant parts of the portable communication device in one embodiment.

FIG. 4 shows an exemplary block schematic of the relevant components of the portable communication device 10 in one embodiment. The phone 10 may include a control unit 46 connected to a radio communication unit 38 that in turn may be connected to a first antenna 40 for communication in the wireless wide area network. The phone 10 may include a positioning unit 42 connected to a second antenna 44 for receiving position signals. The position unit 42 may include a GPS (Global Positioning System) position unit receiving position signals from a GPS satellite. The position unit 42 may be a unit that calculates the position of the cellular phone 10 using triangulation between nodes in the wireless wide-area network. The control unit 46 may be connected to the keypad 30, the display 32, the speaker 34 and the microphone 36. Finally the control unit 46 may be connected to a favourites reminding storage 50 and to a clock 48.

A user of a cellular phone who may watch TV on a television apparatus may be, according to one embodiment, able to receive information about the program he/she is watching through the use of the phone together with the system for determining a program on a media channel. However, for some functionality, in one embodiment, it may be desirable to know the reception environment that the user is located in. This environment may be the reception environment of his/her home. It may be possible for the user to provide this information to a television program determination service provider, which may operate the system, in several ways. According to one embodiment, the user may inform the service provider through sending reception environment data which the user has manually gathered. This data may include data such as the home address of the user as well as indications of if he/she has cable TV, a satellite dish, the suppliers of satellite or cable television etc. This supplier may furthermore have packaged the channels into different packages. The data may thus also include supplier and package information, from which information it may be possible to learn which channels the user has access to. All, or some, of this information may thus be sent to the service provider. The service provider may be informed of what channels the user can receive, e.g., the reception environment. In the case of terrestrial broadcast channels, the user may inform the service provider of any subscriptions of coded channels that he/she has access to. For terrestrial channels the service provider may also get to know the reception environment through knowledge about what channels can be received in the geographical location, such as the home address.

According to another embodiment, information about the reception environment of the user may be provided to the service provider in another way. This variation will now be described with reference being made to the previously described FIGS. 1 to 4, as well as with reference to FIG. 5, which shows a flow chart of a process that may be performed in the cellular phone 10 in order to determine a reception environment of a user, and to FIG. 6, which shows a flow chart of an exemplary process that may be performed in the system 12 in order to determine the reception environment of the user.

Figure 5:
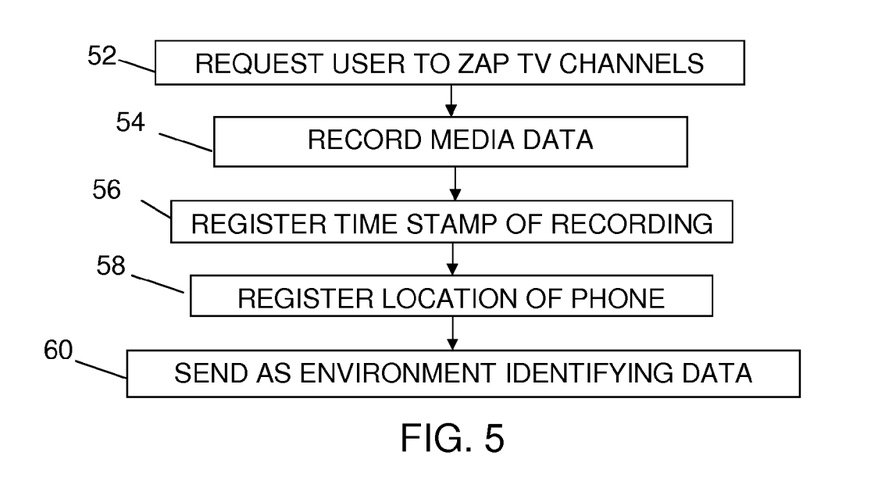
FIG. 5 shows a flow chart of an exemplary process for determining a reception environment of a user.

The user may start a client application that may be run by the control unit 46 of the phone 10 through a selection being made using the keypad 30. In this application, the user may be presented, via the display 32, of the option to determine reception environment. If the user selects this option, via the keypad 30, he/she may be requested to zap through the television channels that can be received by the television apparatus 11 (block 52). As used herein, to zap means to cycle through the television channels using, for example, a remote control. If the user accepts this, he/she may be told to zap while holding the microphone 36 towards the television apparatus 11 during a recording time. As the user zaps the channels, the sound may be recorded by the microphone 36 for each channel being zapped and the sound from all channels may be stored as media data by the control unit 46 (block 54). Time data in the form of one or more time stamps of the recording may, at the same time, be registered by the control unit 46 using, for example, clock 48 (block 56). A time stamp may also be obtained via a system clock of the network N. The control unit 46 may obtain position data from the position unit 42 and may register the location of the phone using these position data (block 58). The control unit 46 may order the wireless wide area network communication unit 38 to send an environment identifying data message to the system 12 of the service provider (block 60), where this message may include the recorded media data (e.g., in the form of a sound file such as MP3 or WAV, for example), the registered time stamp, and registered location.

Figure 6:
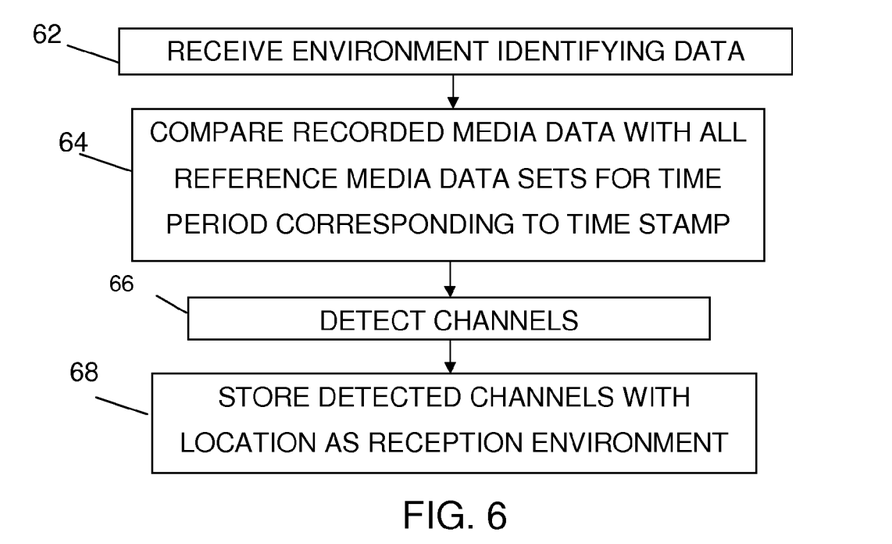
FIG. 6 shows a flow chart of an exemplary process for determining a program on a media channel in order to determine the reception environment of the user.

The environment identifying data message may be received by the wireless wide area network interface 20 (block 62), of the system 12 and may be forwarded to the program handling unit 24 of the program determination device 22. The program handling unit 24 may search through media data of the channels that have been recorded in the program file storage 18 and may send relevant parts of them (based on the received time stamp of the user recorded media data) to the sound comparing unit 29. The sound comparing unit 29 may play the files and may compare the sound of the user recorded media data with the sound of the sets of reference media data. The media data may have time stamps that may be the same or may be provided in an interval, for example, covering all time stamps provided in the media file from the user. The user recorded media data may be compared with the reference media data sets for a time period that corresponds to the time indicated in time data, e.g., time stamps, from the user (block 64). Matching channels may be detected (block 66). The program handling unit 24 may store data identifying these detected channels together with the received location data in the user storage 28 as a reception environment for the user (block 68).

In this way the service provider may know what channels the user has access to in his/her reception environment and it may now be possible to use this information in relation to determining a program according to one embodiment.

Figure 7:
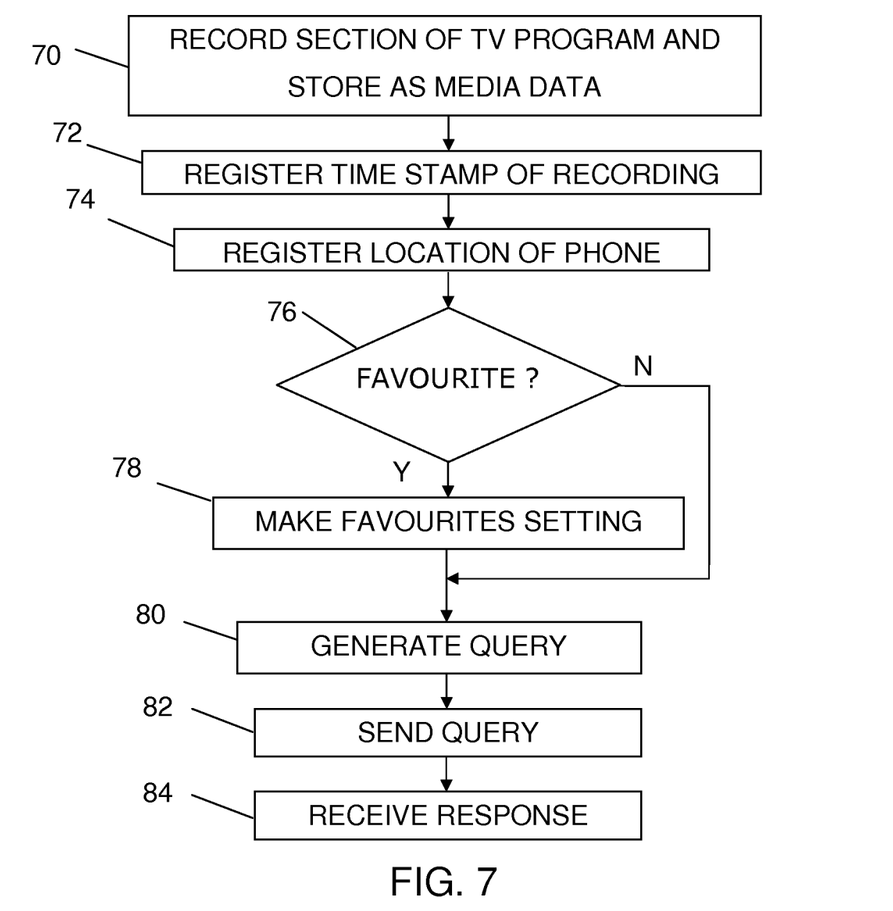
FIG. 7 shows a flow chart of an exemplary process for determining a television program for the user.
Figure 8:
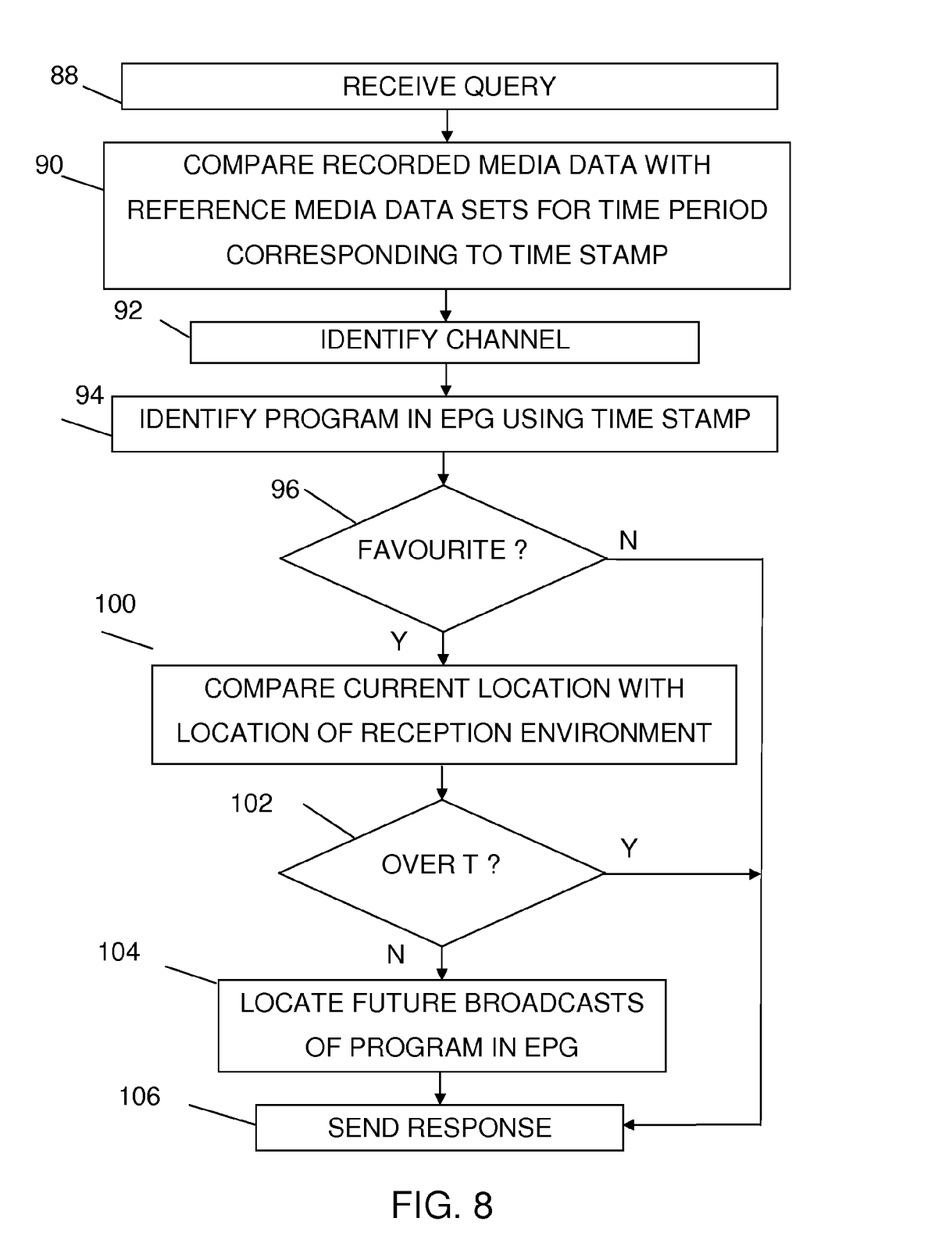
FIG. 8 shows a flow chart of an exemplary process for determining a program on a media channel in order to determine the television program for the user.

How a program of a channel may be determined for a user will now be described in relation to FIGS. 1 to 4, 7, and 8. FIG. 7 shows a flow chart of a process that may be performed in the cellular phone 10 in order to determine a television program for the user. FIG. 8 shows a flow chart of a process that may be performed in the system 12 to determine the television program for the user.

The user may start or access the client application being run by the control unit 46 through using the keypad 30. In one embodiment, the user may be presented, via the display 32, of the option to determine a program on a television channel. The user may want to select this option if he/she is watching a program on the television apparatus 11 and desires to find out what program that is being aired. If the user selects this option, via the keypad 30, he/she may be asked to hold the microphone 36 towards the television apparatus 11 during a recording time. The sound may be recorded by the microphone 36 for a channel that the television apparatus 11 is tuned to and the sound may be stored as media data by the control unit 46 (block 70). In this embodiment, a section of the program may be recorded. Time data in the form of one or more time stamps of the recording may be registered by the control unit 46 using clock 48, for example, or the system clock of the network N (block 72). The control unit 46 may obtain position data from the position unit 42 and may register the location of the phone 10 using this position data (block 74). The control unit 46 may ask the user, via the display 32, if the program is a favourite program. The user may indicate that the program is a favourite or indicate that the program is not via the keypad 30, which response may be received by the control unit 46. If the response was that the program is a favourite (block 76), the control unit 46 makes a favourites setting (block 78), and may generate a query (block 80). If the program is not a favourite (block 76), the query may be generated without a favourites setting (block 80). This query may include the recorded media data (here in the form of a sound file), the registered time stamp, registered location, and favourites setting. The control unit 46 may order the wireless wide area network communication unit 38 to send the query to the system 12 of the service provider. The control unit 46 may receive a response from the system 12 via the wide area wireless communication unit 38 (block 84). The response may include program information that may be presented to the user, for example, via the display 32. In this embodiment, the user may find out what program is being aired. Depending on the favourites setting as well as on different embodiments, the control unit 46 may receive one or several response messages to the query.

The query may be received by the wireless wide area network interface 20 of the system 12 and may be forwarded to the program handling unit 24 of the program determination device 22 (block 88). The program handling unit 24 may search through sets of reference media data of channels that have been recorded in the program file storage 18, may send relevant parts of them (based on the received time stamp) to the sound comparing unit 29. The sound comparing unit may play the files and may compare the sound of the media data from the query with the sound of the sets of reference media data. The reference media data may have time stamps that may be the same or may be provided in an interval covering all time stamps provided in the media file from the user. The user recorded media data may be compared with the sets of reference media data for a time period corresponding to time indicated in time data, e.g., time stamps, from the user (block 90). If a match is made, the channel may be identified (block 92). In one embodiment, in order to expedite the searching the channels, the channels of the reception environment of the user may be investigated first. In one embodiment, other channels may be searched if, for example, there is no match for these channels of the reception environment. Thus, if a match is made and the channel identified, the program handling unit 24 may investigate the electronic program guide 26 in order to locate a program that is being broadcast at the time of the received time stamp. The program of the channel may be identified using the received time stamp (block 94). The program handling unit 24 may investigate if the query had a favourites setting. If there was no such setting (block 96), a response may be sent (block 106) that may include information or data identifying the channel and the program that was being broadcast.

However, if the query had a favourites setting (block 96), the program handling unit 24 fetches the location data of the reception environment of the user from storage 28 and may compare the current location of the phone, e.g., the location indicated by the location data provided in the query, with the fetched location associated with the reception environment (block 100). If there is a difference between these locations that may be above a location difference threshold T (block 102), the response may be sent (block 106) only including information about which program is being broadcast. However, if the difference was below this threshold T (block 102), the program handling unit 24 may look in the electronic program guide 26 and may locate future broadcasts of this program (block 104). The response may be sent (block 106). In one embodiment, the services provided for favourites programs to the user may be restricted based on this threshold.

In one embodiment, a single response including the above mentioned data identifying the program may be sent. According to another embodiment, the response may also include information about some or all future broadcasts of the program located through investigating the electronic program guide. This information about future broadcasts is also denoted reminder data. In this embodiment, the program handling unit 24 may identify a number of times that the electronic program guide indicates that the program will be broadcast in the future and may send data regarding these future broadcasts in the response to the query. As an alternative, in another embodiment, data about future broadcasts of the program may be stored in the user storage 28. When the favourites program is about to be broadcast in the future, the program handling unit 24 may send a reminder to the user via the interface 20 in order to inform him/her that the program is to be broadcast. In this embodiment, reminder data is sent recurrently and may be sent each time the identified program is to be broadcast. This embodiment may provide the advantage of enabling sending reminders to the user of the showing of his/her favourite program. The reminders may be up-to-date and may take account of changes in the planning of the airing of programs. The data regarding the future broadcasts need not be limited to the channel involved in the query, but may be made also for airing of the same program on a different channel in the reception environment of the user.

The threshold described above can be set differently based on if terrestrial broadcast is considered or if cable or satellite broadcasting is considered. In the case of satellite and cable, the threshold may be set very low. Also in the case of terrestrial broadcasting the threshold may be varied based on the distance of the location of the reception environment to a border, like a border to another country, state or region where the channels differ. For this reason the comparison may also consider a directional component of the position of the user indicating the direction to or from a border.

Figure 9:
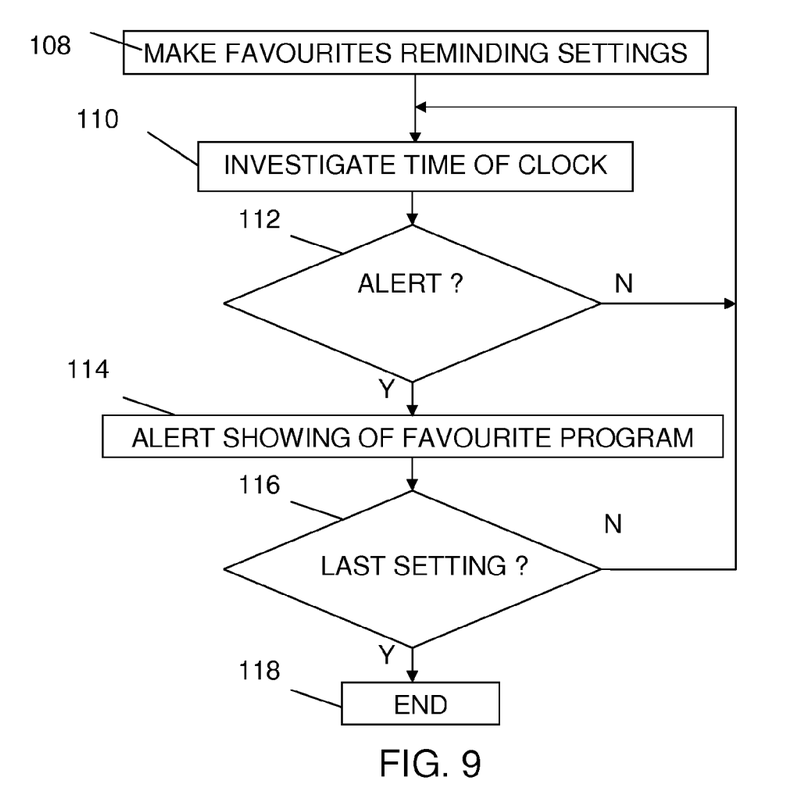
FIG. 9 shows a flow chart of an exemplary process for alerting the user of a favourite program.

As mentioned above the response to the query may include data of future airings of the favourites program. How this may be handled in the device 10, e.g., cellular phone, will now be described in relation to FIGS. 1, 3, 4 and 9. FIG. 9 shows a flow chart of a process to alert the user of a favourite program. The process of FIG. 9 may be performed in the cellular phone 10.

As the response to the query is received by the control unit 46 via the wireless wide area communication unit 38, it may collect the future airing data of the favourites program from the response and may make favourites reminding settings for the program in the favourites reminding storage 50 (block 108). These settings may indicate the airing times of the favourites program. The control unit 46 may investigate the clock 48 or the network clock (block 110). If an airing time coincides with or is close to the time of the clock (block 112), the user may be alerted of the showing (block 114). The alerting is done through presenting data of the program, the channel and the airing time and can be provided through a combination of sound via the speaker 34 and image via the display 32. If the airing time is not close at hand (block 112), the control unit 46 may resume with investigating the clock (block 110). When alerting has been done, the control unit 46 may investigate if the setting was the last. In case it was not the last (block 116), the control unit 46 may resume investigating the clock (block 110), while if it was the last (block 116), the method may end (block 118). In this way the user may be reminded of the showing of his/her favourite programs.

One embodiment may provide a way for a user to find out what program he/she is watching and the user may also find out when it is being aired in the future. This embodiment may allow a user not to miss his/her favourite programs. In one embodiment, the information of a program is not limited to the program itself. It may be possible to provide information about sections of a program, for instance a section where a music video of an artist is aired. If a favourites setting is made, the user may also receive information about the video, artist, an album that the video is taken from, the name of the song, composer of the song, director of the video etc. In this embodiment, it may be possible for the user to find out the future airing of the artist, other songs of the artist from the particular album the song is on or future airings of the song. This may be made for only the particular channel, for example, or for all of the channels of the reception environment of the user. The information about a program being sent may not e limited to the name of the program. Further information may also be possible, such as the director of the program, actors involved etc. The program may also not be limited to a specific program but may be a reference to a program series. Reminders may be sent regarding a whole program series or just the specific program of the series. In this way the user may, for example, receive information about when a specific program, which he/she has perhaps just caught a bit of, will be aired next. One embodiment may be particularly well suited for radio.

According to one aspect, an embodiment may be implemented in a cellular phone with limited additional functionality, since the hardware may already be present. In this case, embodiments may be implemented by including some software. Embodiments may also enable a user to find out information about a program on a media channel in a simple way using his/her portable communication device.

In one embodiment, video may be compared to reference video if the phone has video capturing functionality.

The control unit in the phone, according to one embodiment, may be provided in the form of one or more processors with corresponding memory containing the program code for performing its function, whereas the favourites reminder storage may be provided as a memory module or a part of a memory module, which may be a RAM, ROM or a flash memory. A radio communication unit may be provided as separate hardware modules, for example, in the form of an ASIC circuit. A radio communication unit may, however, be combined with other modules. The different hardware units of the phone may be connected using a data bus.

In one embodiment, the program handling unit and sound comparing unit of the program determination device may likewise be implemented as a processor with corresponding memory comprising program code for performing their functions. The electronic program guide and user storage may also be provided as memory modules like RAM and ROM memory modules. The program file storage a may be provided as one or memory modules, for example, in the form of hard discs.

Figure 10:
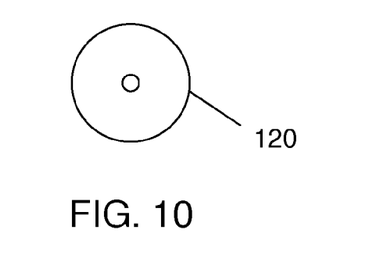
FIG. 10 shows an exemplary CD ROM disc on which program code for executing methods according to one embodiment may be provided.

The program code mentioned above may also be provided on one or more computer program products such as a CD ROM disc 120 as depicted in FIG. 10, which will perform the functioning of either the control unit in the phone or the program handling unit and sound comparing unit in the program determination device when loaded into a phone having suitable processing capabilities or when loaded into the program determination device, which is normally a computer. Naturally, other types of products may be provided for this, like for instance a removable memory like a memory stick. The computer program product can also be provided as software, which may be downloaded remotely from a server either outside or inside the cellular network or be downloaded via a computer like a PC to which the phone is temporarily connected.

There are a number of further variations that can be made to the present invention in addition to those already mentioned. In the system it is not necessary to provide the receiving and recording devices. The reference media data can just as well be obtained from another source, for instance directly from the producers of the material via the Internet. In one embodiment, material is received together with time data indicating when it is being broadcast. It is also not necessary to implement the reminding function. In this case there is therefore no need for the use of any position units or comparison of location data. It may also not necessary to determine a reception environment. As an alternative it is furthermore possible with several reception environments associated with a user, where these can be home, in the country house, in the car and in the office. In this case the user may, when sending a query, also send information about which environment is to be applied. This may allow a quicker location of program information for the user. Finally it is possible to use the time stamps of the set of reference media data to locate a program in the electronic program guide instead of the time stamp of the user recorded media data.

Although the present invention has been described in connection with specific embodiments, it is not intended to be limited to the specific form set forth herein. Rather, the scope of the present invention is limited only by the accompanying claims.

The invention claimed is:

1. A method, performed by one or more devices, for identifying a particular program currently being broadcast on a particular media channel and viewed by a user of a portable communication device, the method comprising:
    receiving, by the one or more devices, a query over a wireless wide area network, from the user of the portable communication device viewing the particular program currently being broadcast on the particular media channel, where the query includes media data, recorded by the portable communication device, comprising a portion of the particular program;

comparing, by the one or more devices, the media data of the query with data of a number of sets of reference media data related to at least one reception environment, where each set corresponds to a broadcast media channel;

identifying, by the one or more devices, the particular media channel based on the comparison of the media data of the query and data of one of the sets of reference media data;

in response to the query, identifying, by the one or more devices, the particular program based on a comparison between time data of the media data of the query used in the identification of the particular media channel and time data in an electronic program guide for the particular media channel; and sending, by the one or more devices, data identifying the particular media channel and the identified program to the portable communication device over the wireless wide area network.

2. The method according to claim 1, further comprising
receiving and demodulating a number of media channels and
recording the media channels in order to generate the sets of reference media data.

3. The method according to claim 1, where each set of reference media data includes reference time data associated with the time of broadcasting a media channel,
the query received from the user includes time data indicating when the media data was recorded and
where comparing comprises comparing time data associated with the time of broadcasting a media channel to time data indicating when the media data was recorded.

4. The method according to claim 1, further comprising
investigating, in the electronic program guide, if the identified program is being broadcast in the future and
sending reminder data to the portable communication device over the wireless wide area network indicating when the identified program is being broadcast in the future.

5. The method according to claim 4, further comprising
receiving a favorites setting and
where investigating if the identified program is being broadcast in the future and sending reminder data are performed based on the favorites setting.

6. The method according to claim 1, further comprising
receiving data identifying a reception environment among a plurality of reception environments.

7. The method according to claim 6, where the data identifying the reception environment includes media data recorded of a plurality of media channels in the reception environment.

8. The method according to claim 6, the method further comprising
applying restrictions on services related to the identifying the particular program based on a comparison of location data of the reception environment and location data of the portable communication device.

9. A system for identifying a particular program currently being broadcast on a particular media channel and viewed by a user of a portable communication device, the system comprising:
a wireless wide area network communication interface for receiving a query, via the wireless wide area network, from the user of the portable communication device viewing the particular program currently being broadcast on the particular media channel, where the query includes media data, recorded by the user, comprising a portion of the particular program, and a program determination device including:
an electronic program guide,
a sound comparing unit, and
a program handling unit to:
order the sound comparing unit to compare the media data of the query with data of a number of sets of reference media data related to at least one reception environment, where each set corresponds to a broadcast media channel,
identify the particular media channel based on a comparison between media data of the query and data of one of the sets of reference media data,
in response to the query, identify the particular program based on a comparison between time data of media data of the query used in the identification of the particular media channel and time data in an electronic program guide for the particular media channel, and
order the wireless wide area network communication interface to send data identifying the particular media channel and the identified program to the portable communication device.

10. The system of claim 9, further comprising
a set of media channel receiving devices for receiving and demodulating the media channels and
a set of media recording devices for recording the media channels in order to generate the sets of reference media data.

11. The system of claim 9, where each set of reference media data includes reference time data associated with the time of broadcasting a media channel,
the query received from the user includes time data indicating when the media data was recorded, and
the program handling unit, when ordering the sound comparing unit to compare media data of the query with the data of the reference media data sets, is to
order comparing time data indicating when the media data was recorded and
reference time data associated with the time of broadcasting a media channel.

12. The system of claim 9, where the program handling unit is further to
investigate in the electronic program guide if the identified program is being broadcast in the future and
order the wireless wide area network communication interface to send reminder data to the portable communication device indicating when the identified program is being broadcast in the future.

13. The system of claim 12, where the wireless wide area network communication interface receives a favorites setting, and
the program handling unit is to
investigate if the identified program is being broadcast in the future and
order the wireless wide area network communication interface to send reminder data based on this favorites setting.

14. The system of claim 9, the program handling unit is further to receive data identifying a reception environment among a plurality of reception environments.

15. The system of claim 14, where the data identifying a reception environment among a plurality of reception environments includes media data recorded by the user of a plurality of media channels received.

16. The system of claim 14, where the program handling unit is to apply restrictions on services related to identifying the particular program based on a comparison of the location data of the reception environment and location data of the portable communication device.

17. A method, performed by a portable communication device, for identifying a particular program currently being broadcast on a particular media channel and currently being viewed by a user of the portable communication device, the method comprising:
- recording, by one or more devices of the portable communication device, a section of a program, being presented by a media presenting apparatus of the portable communication device, as media data;
- generating, by one or more devices, a query regarding the particular media channel and the particular program, where the query includes the recorded media data;
- sending, by one or more devices, the query over a wireless wide area network to a program determination service provider; and
- receiving, by one or more devices, data identifying the particular media channel and the particular program, responsive to the query sent to the program determination service provider over the wireless wide area network, the particular media channel being identified based on a comparison and the particular program being identified by:
  - comparing the media data of the query with data of a number of sets of reference media data related to at least one reception environment, where each set corresponds to a broadcast media channel,
  - identifying the particular media channel based on a comparison between the media data of the query and data of one of the sets of reference media data, and
  - in response to the query, identifying the particular program based on a comparison between time data of media data of the query used in the identification of the channel and time data of the program in an electronic program guide for the media channel.

18. The method according to claim 17, further comprising registering time data when the section is recorded and including the time data in the query.

19. The method according to claim 17, further comprising receiving reminder data over the wireless wide area network indicating when the identified program is being broadcast in the future.

20. The method according to claim 19, further comprising receiving a favorites setting from the user and sending the favorites setting to the program determination service provider, where receiving the reminder data is performed based on this favorites setting.

21. The method according to claim 17, further comprising sending data identifying one of a plurality of reception environments to the media program determination service provider.

22. The method according to claim 21, further comprising recording media data including data from a plurality of media channels and including this media data in the data identifying one of the plurality of reception environments.

23. The method according to claim 21, further comprising sending location data to the program determination service provider for applying restrictions on services related to identifying of the media program.

24. A portable communication device comprising:
a media recording unit,
a wireless wide area network communication unit, and
a control unit to:
- order the media recording unit to record a section of a particular program, currently being broadcast on a particular media channel and being presented by a media presenting apparatus, as media data,
- generate a query regarding the particular media channel and the particular program on the media channel, which query includes the recorded media data,
- order the wireless wide area network communication unit to send the query to a program determination service provider, and
receive data identifying the particular media channel and the particular program, responsive to the query sent to the program determination service provider via the wireless wide area network communication unit, the particular program being determined through the media program determination service provider having:
- compared the media data of the query with data of a number of sets of reference media data related to at least one reception environment, where each set corresponds to a broadcast media channel,
- identified the particular media channel based on a comparison between media data of the query and data of a set of reference media data, and
- in response to the query, identified the particular program based on a comparison between time data of media data of the query used in the identification of the channel and time data of the program in an electronic program guide for the channel.

25. The portable communication device according to claim 24, where the control unit is further to
register time data when the section is recorded and
include the time data in the query.

26. The portable communication device according to claim 24, where the control unit is further to receive reminder data indicating when the identified program is being broadcast in the future via the wireless wide area network communication unit.

27. The portable communication device according to claim 26, further comprising a user interface, where the control unit is further to
receive a favorites setting from a user via the user interface and
include the favorites setting in the query, where the reception of reminder data is based on this favorites setting.

28. The portable communication device according to claim 24, where there are several possible reception environments and the control unit is further to order sending of environment identifying data to the program determination service provider.

29. The portable communication device according to claim 28, where the control unit is further to order the media recording unit to record media data including data from a plurality of media channel and to include this media data in the environment identifying data.

30. The portable communication device according to claim 28, further comprising a position unit, where the control unit is to receive location data from the position unit for inclusion in the query in order to allow the media program determination service provider to apply restrictions on services related to the identifying of the media particular program.

* * * * *